United States Patent

Kumada et al.

[11] Patent Number: 5,632,559
[45] Date of Patent: May 27, 1997

[54] SLIDING BEARING

[75] Inventors: Yoshio Kumada; Katsuyuki Hashizume; Soji Kamiya, all of Toyota, Japan

[73] Assignee: Taiho Kogyo Co., Ltd., Aichi, Japan

[21] Appl. No.: 549,726
[22] PCT Filed: Mar. 17, 1995
[86] PCT No.: PCT/JP95/00465
  § 371 Date: Nov. 13, 1995
  § 102(e) Date: Nov. 13, 1995
[87] PCT Pub. No.: WO95/25907
  PCT Pub. Date: Sep. 28, 1995

[30] Foreign Application Priority Data

Mar. 18, 1994 [JP] Japan .................. 6-073959

[51] Int. Cl.⁶ ................................ F16C 33/24
[52] U.S. Cl. .......................... 384/283; 384/276
[58] Field of Search ...................... 384/276, 280, 384/282, 283, 284, 286, 291, 292

[56] References Cited

U.S. PATENT DOCUMENTS

| | | | |
|---|---|---|---|
| 4,400,099 | 8/1983 | Ehrentraut | 384/283 |
| 4,538,929 | 9/1985 | Ehrentraut et al. | 384/120 |
| 4,561,787 | 12/1985 | Ehrentraut et al. | 384/295 |
| 4,606,653 | 8/1986 | Ehrentraut et al. | 384/283 |
| 5,071,263 | 12/1991 | Kamiya et al. | 384/284 |
| 5,116,144 | 5/1992 | Kamiya et al. | 384/291 |
| 5,238,311 | 8/1993 | Katou et al. | 384/288 |

FOREIGN PATENT DOCUMENTS

| | | |
|---|---|---|
| 385822B | 5/1988 | Austria . |
| 0155257A2 | 9/1985 | European Pat. Off. . |
| 0155257B1 | 9/1985 | European Pat. Off. . |
| 63-6215 | 1/1988 | Japan . |
| 63-30619 | 2/1988 | Japan . |
| 63-11530 | 3/1988 | Japan . |
| 2-142921 | 6/1990 | Japan . |
| 4-39461 | 9/1992 | Japan . |
| 5-6412 | 2/1993 | Japan . |
| 5-8337 | 3/1993 | Japan . |
| 6-19850 | 5/1994 | Japan . |
| 60-205014 | 10/1994 | Japan . |

*Primary Examiner*—Thomas R. Hannon
*Attorney, Agent, or Firm*—Flynn, Thiel, Boutell & Tanis, P.C.

[57] ABSTRACT

A sliding bearing is disclosed with a bearing alloy layer having an annular groove formed around its inner peripheral surface. The bearing alloy layer is sequentially coated with an intermediate layer and an overlay layer, so that upon abrasion, the portions of the overlay layer and the intermediate layer which remain in the recess of the annular groove; as well as the peaks of the bearing alloy layer which are defined between annular grooves, become exposed. In accordance with the invention, the peak has a height h and the intermediate layer has a thickness t, which, when taken on an abscissa and an ordinate, respectively, satisfy the following requirements: (1) $1 \leq h < 5$, (2) $t \leq 2h/3 + 1/3$ and (3) $t \leq 3$, where h and t are denoted in units of μm. More preferably, the following requirements are satisfied: (4) $1 \leq h < 5$, and (5) $t \leq h/2$. This choice enables an improvement in the initial abrasion resistance, and the seizure resistance and affinity after the overlay layer is abraded.

19 Claims, 2 Drawing Sheets

FIG.3

| sample | | thickness of intermediate layer (μm) | peak height (μm) | seizure resistance | | abutment |
|---|---|---|---|---|---|---|
| | | | | at initial abrasion | after abrasion of overlay layer | |
| second invention | 1 | 0.1 | 1 | 110 | 85 | fair |
| | 2 | 0.5 | 1 | 110 | 80 | fair |
| | 3 | 0.1 | 2 | 110 | 90 | good |
| | 4 | 1 | 2 | 110 | 80 | good |
| | 5 | 0.1 | 3 | 100 | 95 | excellent |
| | 6 | 1.5 | 3 | 100 | 80 | excellent |
| | 7 | 1 | 4 | 110 | 85 | excellent |
| | 8 | 2 | 4 | 95 | 80 | excellent |
| | 9 | 0.1 | 4.8 | 90 | 85 | excellent |
| basic invention | 10 | 1 | 1 | 100 | 70 | fair |
| | 11 | 2 | 3 | 95 | 75 | excellent |
| | 12 | 3 | 4 | 90 | 75 | good |
| control | a | 2.5 | 5 | 80 | 75 | excellent |
| | b | 0.1 | 6 | 80 | 75 | excellent |
| | c | 0.1 | 7 | 75 | 75 | good |
| | d | 1 | 7 | 70 | 70 | good |
| | e | 3 | 7 | 70 | 20 | good |
| | f | 4 | 7 | 45 | 10 | not good |
| | g | 0.1 | 8 | 60 | 35 | fair |
| | h | 2.5 | 9 | 45 | 25 | not good |
| control | I | 0.1 | 0 | 110 | 80 | not good |
| | II | 1 | 0.5 | 110 | 50 | not good |
| | III | 2 | 0 | 90 | 20 | not good |
| | IV | 3 | 1 | 80 | 15 | not good |
| | V | 3.5 | 5 | 70 | 15 | fair |

SLIDING BEARING

TECHNICAL FIELD

The invention relates to a sliding bearing, and more particularly, to a sliding bearing including a bearing alloy layer, an intermediate layer and an overlay layer.

BACKGROUND OF THE INVENTION

A sliding bearing is known in the art which comprises a bearing alloy layer having a multitude of circumferentially extending and axially spaced annular grooves formed around the inner peripheral surface thereof to define a circumferentially extending peak between a pair of axially adjacent annular grooves, an intermediate layer provided on the surface of the bearing alloy layer, and an overlay layer provided on the surface of the intermediate layer, the arrangement bearing such that when the overlay layer and the intermediate layer are partly abraded, beginning from the surface of the overlay layer, the overlay layer and the intermediate layer which remain in the recess of the annular groove, as well as the peak of the bearing alloy layer, are exposed (see Japanese Laid-Open Patent Application No. 205,014/198.5).

With a sliding bearing thus constructed, when the overlay layer and the intermediate layer are partly abraded beginning from the surface of the overlay layer, the overlay layer and the intermediate layer which remain in the recess of the annular groove, as well as the peak of the bearing alloy layer, are exposed, thus preventing the intermediate layer from being extensively exposed immediately, as experienced in a sliding bearing of the the kind which is not provided with such annular grooves, which would cause a substantial reduction in seizure resistance as a result of the extensive exposure of the intermediate layer.

However, in the cited Japanese Laid-Open Patent Application, it is described that the intended effect is achieved only when the depth of the annular groove or the height of the peak is equal to or greater than one and one-half the thickness of the intermediate layer and equal to or greater than 5 μm.

DISCLOSURE OF THE INVENTION

However, as a result of various experiments conducted with varying thicknesses of the intermediate layer or varying heights of the peak, has been found that a bearing, which has an excellent affinity and seizure resistance, is obtained, even with a peak height which is less than 5 μm.

Accordingly, the invention basically provides a sliding bearing having a peak height which is less than 5 μm and which exhibits an excellent bearing performance with respect to affinity and seizure resistance.

Specifically, according to a basic aspect of the invention, a sliding bearing constructed in the manner mentioned above has a height h of the peak, taken on the abscissa, and a thickness t of the intermediate layer, taken on the ordinate, which graphically satisfy the following three requirements:

$$1 \leq h < 5 \quad (1)$$

$$t \leq 2h/3 + \tfrac{1}{3} \quad (2)$$

$$t \leq 3 \quad (3)$$

where h and t are denoted in units of μm.

According to another aspect of the invention, the thickness t and the height h satisfy the following requirements:

$$1 \leq h < 5 \quad (4)$$

$$t \leq h/2 \quad (5)$$

According to this aspect of the invention; an affinity and a seizure resistance which are superior to those exhibited by conventional sliding bearings are achieved, as will be demonstrated by test results to be described later. When these additional requirements are not satisfied, the invention itself provides good affinity and seizure resistance, which are stabilized, even though the superiority of performance is reduced as compared with that obtained with the second aspect.

BRIEF DESCRIPTION OF THE DRAWINGS

FIG. 3 is a chart of test results indicating the abrasion resistance at the beginning of use of the invention, the seizure resistance and the affinity after the overlay layer is abraded.

BEST MODE OF CARRYING OUT THE INVENTION

Figure 1:
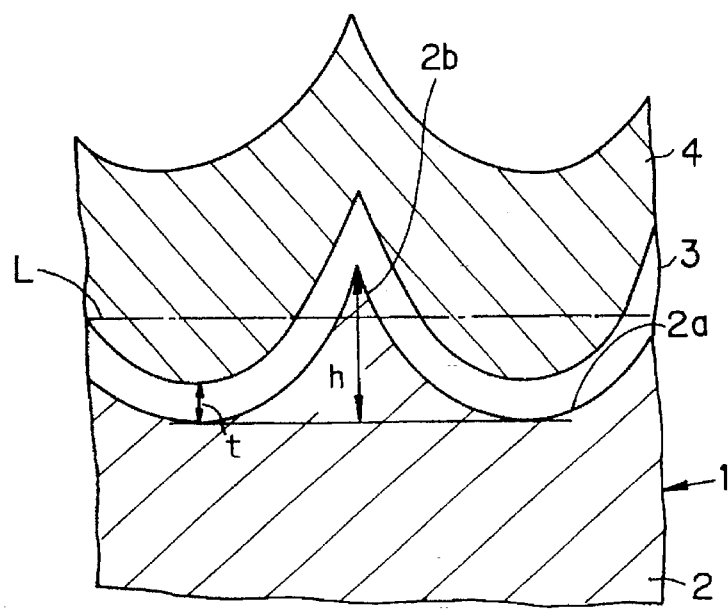
FIG. 1 is a cross section of a sliding bearing according to the invention.

Referring to the drawings, the invention will be described with respect to an embodiment thereof.

FIG. 1 is an enlarged cross section of a sliding bearing 1 which is formed in semi-cylindrical or cylindrical configuration. The sliding bearing 1 includes a bearing alloy layer 2 which is secured to a backing, not shown, and a circumferentially extending helical annular groove 2a formed around the inner peripheral surface of the layer 2, thereby defining a circumferentially extending peak 2b between a pair of axially adjacent annular grooves 2a.

The surface of the bearing alloy layer 2 is covered by an intermediate layer 3, which conforms to the surface of the alloy layer 2 to present an uneven surface. The surface of the intermediate layer 3 is in turn covered by an overlay layer 4. The purpose of the intermediate layer 3 is to achieve a tight adherence between the alloy layer 2 and the overlay layer 4.

With this arrangement, when the overlay layer 4 and the intermediate layer 3 are partly abraded beginning from the surface of the overlay layer 4, the portions of the overlay layer 4 and the intermediate layer 3 which remain within the recess of the annular groove 2a, as well as the peak 2b of the alloy layer 2, will be exposed, as indicated by phantom line L.

Figure 2:
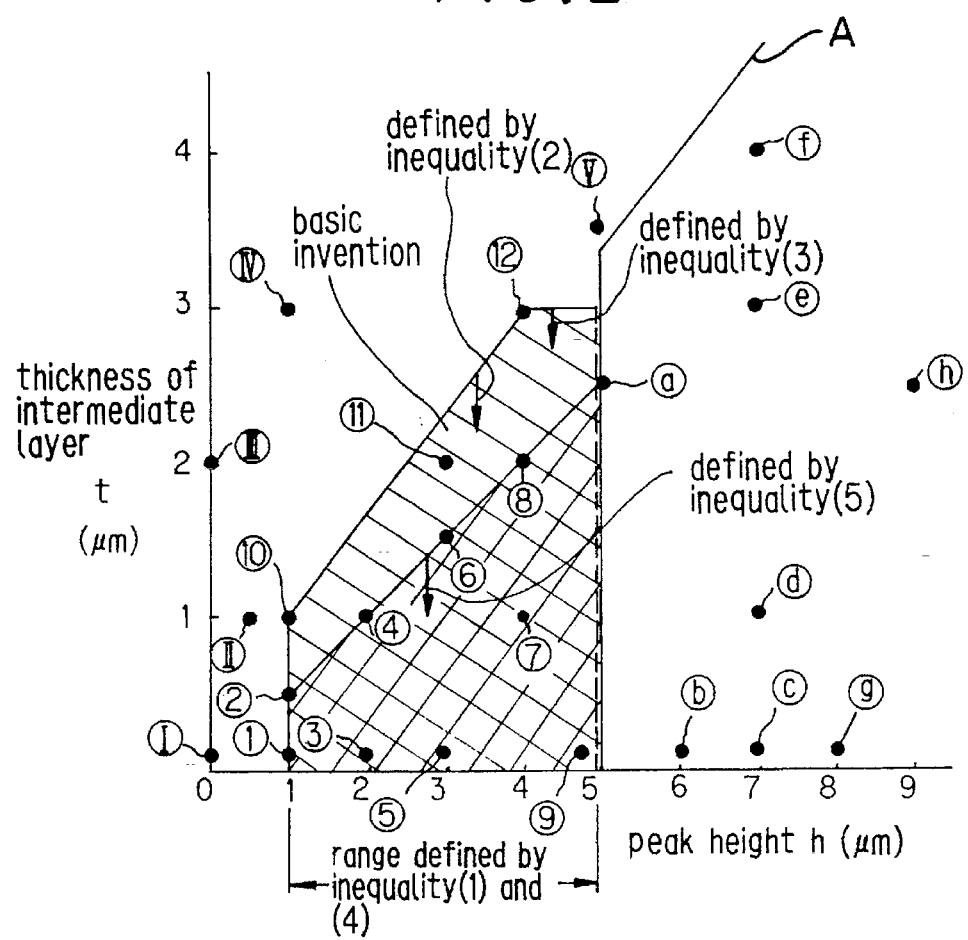
FIG. 2 graphically shows the range in which the requirements of the invention are satisfied.

Referring to FIG. 2, in accordance with the invention, when the height h of the peak 2b and the thickness t of the intermediate layer 3 are taken on the abscissa and the ordinate, respectively, on a graphical representation, the thickness t and the height h are chosen in a range which satisfy the following three inequalities, which range is shown by cross-hatched lines:

$$1 \leq h < 5 \quad (1)$$

$$t \leq 2h/3 + \tfrac{1}{3} \quad (2)$$

$$t \leq 3 \quad (3)$$

where h and t are represented in units of μm.

According to another aspect of the invention, the thickness t and the height h additionally satisfy the following requirements:

$$1 \leq h < 5 \quad (4)$$

$$t \leq h/2 \quad (5)$$

It is to be noted that in the illustration of FIG. 1, the scales used in a longitudinal and a transverse direction are greatly different from each other, it being noted that the helical, annular groove 2a desirably has a pitch of 0.2 mm, for example. The range recommended by the Japanese Laid-Open Patent Application cited above is indicated by an area located to the right of a folded line A in FIG. 2.

The effect of the invention will be described on the basis of the results of tests conducted on the seizure resistance at the beginning of use of the sliding bearing and, the seizure resistance and affinity after the overlay layer 4 is abraded.

Referring to the chart shown in FIG. 3, samples 1 to 12 represent products according to the invention in which samples 1–9 additionally satisfy the requirements of the inequalities (4) and (5). Samples a to h are located in a range recommended by the Japanese Laid-Open Patent Application cited above, and samples I to V are located outside both ranges on the graph.

Each sample used in the tests includes a backing of SPCC on which a bearing alloy layer 2 comprising 12% by weight of Sn, 1.5% of Pb, 2.8% of Si, 1% of Cu and 0.2% of Cr and the remainder of Al is applied by pressure welding. An annular groove 2a is formed in the surface of the alloy layer 2 to a required depth with a pitch of 0.2 mm. Subsequently, the surface of the alloy layer 2 is electroplated with Ni to a required thickness to form the intermediate layer 3, on which a 5 μm thick overlay layer 4 comprising 2.5% of Sn and 5% of In and the remainder of Pb is applied by electroplating.

The seizure resistance test has been conducted under the following test conditions:

Testing machine: Seizure testing machine of journal type
Number of revolutions: 1300 rpm
Lubricant oil: 10 W–30
Oil temperature: 140° C.
Mating shaft: S45C hardened, with diameter of 42 mm
Bearing clearance: 20–50 μm
Load pattern: 50 kg/cm² for initial 60 minutes, followed by 100 kg/cm² during subsequent 45 minutes, and subsequently, the load is increased at a rate of 100 kg/cm² evey 45 minutes until seizure occurs.

When testing the seizure resistance after the overlay layer 4 is abraded, the overlay layer 4 is initially formed to a thickness of 2 μm, and assuming heat is generated by the bearing during actual use, a sample which has been overheated at 155° C. for 240 hours is employed for evaluation.

During the affinity test, each sample is assembled in a larger end of a connecting rod of a seriatum 4-cylinder, 1,600 cc engine, and is subjected to a cycle of an idling phase of one minute and a full load at 6,000 rpm of four minutes, which is repeated over a time interval of five hours. After disassembly, the abutment which each sample is subjected to is determined by a visual inspection into four levels of "excellent", "good", "fair" and "not good".

As shown in the chart of FIG. 3, the bearing according to the invention exhibited an excellent result with respect to seizure resistance at the beginning of use and, the seizure resistance and affinity after the overlay layer 4 was abraded. By contrast, considering control samples a to h, it is noted that a relatively good result is obtained when the height of the peak is close to 5 μm, namely, from samples a–e having a height in a range of 5–7 μm while a poor result is noted when the height of the peak is far greater than 5 μm, namely, for samples f–h having a height in the range of 7–9 μm. It will be seen from this that a height of the peak less than 5 μm is required in order to achieve a good performance.

On the other hand, from the standpoint of the affinity, it is required that the height of the peak be equal to or greater than 1 μm, and it is noted that the affinity is "not good" for samples I–III having a height less than 1 μm.

If the height of the peak is chosen in a range of 1–5 μm as according to the invention, if the thickness of the intermediate layer is too thick with respect to the height of the peak, as exemplified by the samples IV and V, the seizure resistance is degraded, in particular, the seizure resistance after the overlay layer 4 is abraded. Accordingly, the requirements as represented by the inequalities (2) and (3) must be satisfied at a minimum, and desirably the requirement represented by the inequality (5) should also be satisfied.

It is confirmed that the abrasion resistance of the products according to the invention exhibits an abrasion resistance which is on the order of from one and one-half to three times higher than that of the control samples a to h.

In addition to those used in the samples, the alloy layer 2 used in the invention may preferably comprise an Al-alloy bearing material such as Al-12% Sn-1.5% Pb-2.5% Si-1% Cu-0.2% Cr, or a Cu-alloy bearing material such as Cu-23% Pb-3% Sn or Cu-15% Pb-1.5% Sn or Cu-1% Ag. Preferably, the intermediate layer 3 may comprise Ni, Cu, Cr and Fe, applied by a wet or dry plating. In addition to those described above, the overlay layer 4 preferably comprises Pb alloy materials such as Pb-3% Sn-5% In or Pb-10% Sn 2% Cu, or pure Sn or Sn alloy materials. In addition, a synthetic resin material containing a polyimide and $MoS_2$ or graphite may be used.

What is claimed is:

1. A sliding bearing comprising a bearing alloy layer having a plurality of circumferentially extending and axially spaced annular grooves formed around an inner peripheral surface thereof to define a circumferentially extending peak between a pair of axially adjacent annular grooves, an intermediate layer provided on the surface of the bearing alloy layer and an overlay layer provided on the surface of the intermediate layer, characterized in that the peak has a height h, on an abscissa, and the intermediate layer has a thickness t, on an ordinate, which graphically satisfy the following three requirements:

$$1 \leq h < 5 \quad (1)$$

$$t \leq 2h/3 + \tfrac{1}{3} \quad (2)$$

$$t \leq 3 \quad (3)$$

where h and t are denoted in units of μm.

2. A sliding bearing according to claim 1, in which the bearing alloy layer comprises a material selected from the group consisting of an Al alloy and a Cu alloy.

3. A sliding bearing according to claim 1, in which the intermediate layer is formed by plating a material selected from the group consisting of Ni, Cu, Cr and Fe on the bearing alloy layer.

4. A sliding bearing according to claim 1, in which the overlay layer comprises a material selected from the group consisting of a Pb alloy, pure Sn, a Sn alloy and a synthetic resin.

5. A sliding bearing according to claim 1, wherein $1 \leq h \leq 4$ and $1 \leq t \leq 3$.

6. A sliding bearing according to claim 5, wherein h=3 and t=2.

7. A sliding bearing according to claim 1, wherein h=4 and t=3.

8. A sliding bearing comprising a bearing alloy layer having a plurality of circumferentially extending and axially spaced annular grooves formed around an inner peripheral surface thereof to define a circumferentially extending peak between a pair of axially adjacent annular grooves, an intermediate layer provided on the surface of the bearing alloy layer and an overlay layer provided on the surface of the intermediate layer, characterized in that the peak has a height h, on an abscissa, and the intermediate layer has a thickness t, on an ordinate, which graphically satisfy the following requirements:

$$1 \leq h < 5 \quad (4)$$

$$t \leq h/2 \quad (5)$$

where h and t are denoted in units of μm.

9. A sliding bearing according to claim 8 in which the bearing alloy layer comprises a material selected from the group consisting of an Al alloy and a Cu alloy.

10. A sliding bearing according to claim 8, in which the intermediate layer is formed by plating a material selected from the group consisting of Ni, Cu, Cr and Fe on the bearing alloy layer.

11. A sliding bearing according to claim 8, in which the overlay layer comprises a material selected from the group consisting of a Pb alloy, pure Sn, a Sn alloy and a synthetic resin.

12. A sliding bearing according to claim 8, wherein h=1 and t=0.5.

13. A sliding bearing according to claim 8, wherein $1 \leq h \leq 4.8$ and $0.1 \leq t \leq 2$.

14. A sliding bearing according to claim 13, wherein h=3 and t=0.1.

15. A sliding bearing according to claim 13, wherein h=3 and t=1.5.

16. A sliding bearing according to claim 13, wherein h=4 and t=1.

17. A sliding bearing according to claim 13, wherein h=4 and t=2.

18. A sliding bearing according to claim 13, wherein h=4.8 and t=0.1.

19. A sliding bearing according to claim 13, wherein h=2 and t=0.1.

* * * * *